US012051404B2

(12) United States Patent
Sainath et al.

(10) Patent No.: US 12,051,404 B2
(45) Date of Patent: **\*Jul. 30, 2024**

(54) EFFICIENT STREAMING NON-RECURRENT ON-DEVICE END-TO-END MODEL

(71) Applicant: Google LLC, Mountain View, CA (US)

(72) Inventors: Tara Sainath, Jersey City, NJ (US); Arun Narayanan, Milpitas, CA (US); Rami Botros, Mountain View, CA (US); Yanzhang He, Mountain View, CA (US); Ehsan Variani, Mountain View, CA (US); Cyril Allauzen, Mountain View, CA (US); David Rybach, Aachen (DE); Ruoming Pang, New York, NY (US); Trevor Strohman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,211

(22) Filed: Jun. 16, 2023

(65) Prior Publication Data
US 2023/0343328 A1 Oct. 26, 2023

Related U.S. Application Data

(63) Continuation of application No. 17/316,198, filed on May 10, 2021, now Pat. No. 11,715,458.
(Continued)

(51) Int. Cl.
*G10L 15/00* (2013.01)
*G10L 15/02* (2006.01)
(Continued)

(52) U.S. Cl.
CPC ............ *G10L 15/063* (2013.01); *G10L 15/02* (2013.01); *G10L 15/22* (2013.01); *G10L 15/30* (2013.01)

(58) Field of Classification Search
CPC ....... G10L 15/16; G10L 19/00; G10L 19/005; G10L 25/27; G10L 25/30; G10L 15/07;
(Continued)

(56) References Cited

U.S. PATENT DOCUMENTS

| 11,715,458 B2 * | 8/2023 | Sainath ................... G10L 15/32 704/270 |
| 2020/0349950 A1 | 11/2020 | Yoshioka et al. |
| 2020/0349954 A1 | 11/2020 | Yoshioka et al. |

OTHER PUBLICATIONS

USPTO. Office Action relating to U.S. Appl. No. 17/316,198, dated Dec. 8, 2022.

* cited by examiner

*Primary Examiner* — Vu B Hang
(74) *Attorney, Agent, or Firm* — Honigman LLP; Brett A. Krueger; Grant Griffith

(57) ABSTRACT

An ASR model includes a first encoder configured to receive a sequence of acoustic frames and generate a first higher order feature representation for a corresponding acoustic frame in the sequence of acoustic frames. The ASR model also includes a second encoder configured to receive the first higher order feature representation generated by the first encoder at each of the plurality of output steps and generate a second higher order feature representation for a corresponding first higher order feature frame. The ASR model also includes a decoder configured to receive the second higher order feature representation generated by the second encoder at each of the plurality of output steps and generate a first probability distribution over possible speech recognition hypothesis. The ASR model also includes a language model configured to receive the first probability distribution over possible speech hypothesis and generate a rescored probability distribution.

20 Claims, 8 Drawing Sheets

Related U.S. Application Data

(60) Provisional application No. 63/165,068, filed on Mar. 23, 2021.

(51) Int. Cl.
  *G10L 15/06* (2013.01)
  *G10L 15/22* (2006.01)
  *G10L 15/30* (2013.01)

(58) Field of Classification Search
  CPC ......... G10L 15/20; G10L 15/22; G10L 15/26; G10L 15/30; G10L 15/02; G10L 15/063; G10L 15/12; G10L 15/08; G10L 15/14; G10L 15/197; G10L 15/1815; G10L 15/1822; G10L 15/183; G10L 15/19; G10L 15/193
  See application file for complete search history.

EFFICIENT STREAMING NON-RECURRENT ON-DEVICE END-TO-END MODEL

CROSS REFERENCE TO RELATED APPLICATIONS

This U.S. patent application is a continuation of, and claims priority under 35 U.S.C. § 120 from, U.S. patent application Ser. No. 17/316,198, filed on May 10, 2021, which claims priority under 35 U.S.C. § 119(e) to U.S. Provisional Application 63/165,068, filed on Mar. 23, 2021. The disclosures of these prior applications are considered part of the disclosure of this application and are hereby incorporated by reference in their entireties.

TECHNICAL FIELD

This disclosure relates to an efficient streaming non-recurrent on-device end-to-end model.

BACKGROUND

Automated speech recognition (ASR) systems have evolved from multiple models where each model had a dedicated purpose to integrated models where a single neural network is used to directly map an audio waveform (i.e., input sequence) to an output sentence (i.e., output sequence). This integration has resulted in a sequence-to-sequence approach, which generates a sequence of words (or graphemes) when given a sequence of audio features. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system. These E2E automatic speech recognition (ASR) systems have made tremendous progress, surpassing conventional ASR systems in several common benchmarks including word error rates (WER). The architecture of E2E ASR models are largely application dependent. For instance, a number of applications that involve user interaction, such as voice-search or on-device dictation, require the model to perform recognition in a streaming fashion. Other applications, like offline video captioning, do not require the model to be streaming and can make use of future context to improve performance. Additionally, existing E2E models are trained on only a small fraction of audio-text pairs compared to the over 100 billion text utterances that a conventional model is trained with.

SUMMARY

One aspect of the disclosure provides an automated speech recognition (ASR) model includes a first encoder configured to receive, as input, a sequence of acoustic frames and generate, at each of a plurality of output steps, a first higher order feature representation for a corresponding acoustic frame in the sequence of acoustic frames. The ASR model also includes a second encoder configured to receive, as input, the first higher order feature representation generated by the first encoder at each of the plurality of output steps and generate, at each of the plurality of output steps, a second higher order feature representation for a corresponding first higher order feature frame. The ASR model also includes a decoder configured to receive, as input, the second higher order feature representation generated by the second encoder at each of the plurality of output steps and generate, at each of the plurality of time steps, a first probability distribution over possible speech recognition hypothesis. The ASR model also includes a language model configured to receive, as input, the first probability distribution over possible speech hypothesis and generate, at each of the plurality of time steps, a rescored probability distribution over possible speech recognition hypothesis.

Implementations of the disclosure may include one or more of the following optional features. In some implementations, the second encoder generates the second higher order feature representation without receiving any of the acoustic frames as input. In some examples, the decoder is further configured to receive, as input, the first higher order feature representation generated by the first encoder at each of the plurality of output steps and generate, at each of the plurality of time steps, a second probability distribution over possible speech recognition hypothesis. In these examples, the decoder may include a prediction network configured to, at each of the plurality of time steps: receive, as input, a sequence of N previous non-blank symbols output by a final Softmax layer; for each non-blank symbol of the sequence of N previous non-blank symbols, generate a respective embedding; and generate an average embedding by averaging the respective embeddings. Here, the decoder also includes a joint network configured to receive, as input, the average embedding generated by the prediction network at each of the plurality of output steps and one of the first higher order feature representation generated by the first encoder at each of the plurality of output steps when the ASR model is operating in a streaming mode or the second higher order feature representation generated by the second encoder at each of the plurality of output steps when the ASR model is operating in a non-streaming model. The joint network is also configured to generate, at each of the plurality of output steps, one of the second probability distribution over possible speech recognition hypothesis when the ASR model is operating in the streaming mode or the first probability distribution over possible speech recognition hypothesis when the ASR model is operating in the non-streaming mode.

The prediction network may include a V2 embedding look-up table. Optionally, the first encoder may include a causal encoder that includes an initial stack of conformer layers. In some examples, the second encoder includes a non-causal encoder that includes a final stack of conformer layers overlain on the initial stack of conformer layers. In some implementations, the language model includes a neural language model. In these implementations, the neural language model may include a stack of conformer layers or transformer layers. The first encoder and the second encoder may be trained using Hybrid Autoregressive Transducer Factorization to facilitate integration of the language model trained on text-only data.

Another aspect of the disclosure provides a computer-implemented method that when executed on data processing hardware causes the data processing hardware to perform operations. The operations include receiving, as input to an ASR model, a sequence of acoustic frames. The operations also include performing, using the ASR model, streaming speech recognition and non-streaming speech recognition on the sequence of acoustic frames by: generating, by a first encoder, at each of a plurality of output steps, a first higher order feature representation for a corresponding acoustic frame in the sequence of acoustic frames; receiving, as input to a second encoder, the first higher order feature representation generated by the first encoder at each of the plurality of output steps; generating, by the second decoder, at each of the plurality of output steps, a second higher order feature representation for a corresponding first higher order feature frame; receiving, as input to a decoder, the second higher order feature representation generated by the second encoder at each of the plurality of output steps; and generating, at each of the plurality of time steps, a first probability distribution over possible speech recognition hypothesis. The operations also include rescoring, using an external language model, the first probability distribution over possible speech recognition hypothesis to generate a transcription of the utterance.

Implementations of the disclosure may include one or more of the following optional features. In some implementations, the second encoder generates the second higher order feature representation without receiving any of the acoustic frames as input. In some examples, the operations of performing streaming speech recognition and non-streaming speech recognition on the sequence of acoustic frames further include receiving, as input to the decoder, the first high order feature representation generated by the first encoder at each of the plurality of output steps and generating, at each of the plurality of time steps, a second probability distribution over possible speech recognition hypothesis. In these examples, at each of the plurality of time steps, the operations may further include: receiving, as input to a prediction network, as sequence of N previous non-blank symbols output by a final Softmax layer; for each non-blank symbol of the sequence of N previous non-blank symbols, generating, by the prediction network, a respective embedding; and generating, by the prediction network, an average embedding by averaging the respective embeddings. Here, the operations further include: receiving, as input to a joint network, the average embedding generated by the prediction network at each of the plurality of output steps and one of the first higher order feature representation generated by the first encoder at each of the plurality of output steps when the ASR model is operating in a streaming mode or the second higher order feature representation generated by the second encoder at each of the plurality of output steps when the ASR model is operating in a non-streaming mode; and generating, at each of the plurality of output steps, one of the second probability distribution over possible speech recognition hypothesis when the ASR model is operating in the streaming mode or the first probability distribution over possible speech recognition hypothesis when the ASR model is operating in the non-streaming mode.

The prediction network may include a V2 embedding look-up table. Optionally, the first encoder may include a causal encoder that includes an initial stack of conformer layers. In some examples, the second encoder includes a non-causal encoder that includes a final stack of conformer layers overlain on the initial stack of conformer layers. In some implementations, the language model includes a neural language model. In these implementations, the neural language model may include a stack of conformer layers or transformer layers. The first encoder and the second encoder may be trained using Hybrid Autoregressive Transducer Factorization to facilitate integration of the language model trained on text-only data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

End-to-end (E2E) automatic speech recognition (ASR) models are traditionally structured to operate in either a streaming mode or a non-streaming mode. Conventionally, an E2E ASR model includes an encoder and a decoder as the main components. Applications that involve end-user interaction, like voice-search or on-device dictation, may require the model to perform recognition in a streaming fashion, where the words are expected to be output as they are spoken with as little latency as possible. This prevents the use of models that use future context to improve accuracy, such as bi-directional LSTMs. By contrast, applications such as offline video captioning do not require streaming recognition and may make full use of any available future context to improve performance. Furthermore, conventional E2E ASR models are trained on a small fraction of audio-text pairs as compared to over 100 billion text utterances that a conventional model is trained with, and thus performs poorly on long-tail proper nouns and rare words.

Implementations herein are directed toward a single E2E ASR model that uses cascaded encoders that can operate in both streaming and non-streaming modes in combination with an on-device neural language model trained on text-only data. The cascaded encoders include a streaming encoder and a non-streaming encoder, while a single decoder of the ASR model is configured to learn to decode either the output from the streaming encoder or the output from the non-streaming encoder. In addition to ASR models, the architecture can apply to other models such as machine translation that implement both streaming and non-streaming modes.

Figure 1A:
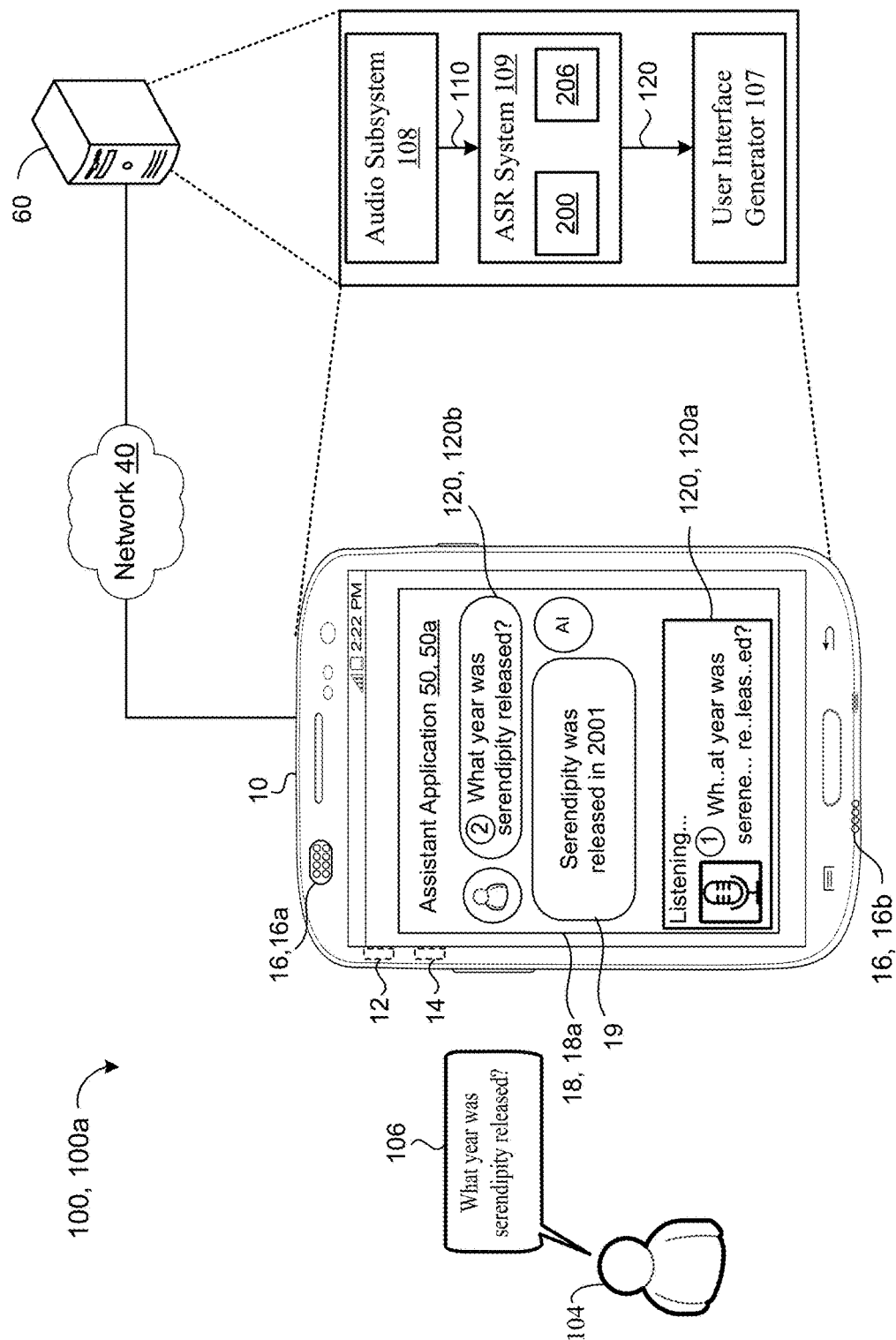
FIGS. 1A and 1B are schematic views of example speech environments using a cascaded encoders and language model architecture for automatic speech recognition.
Figure 1B:
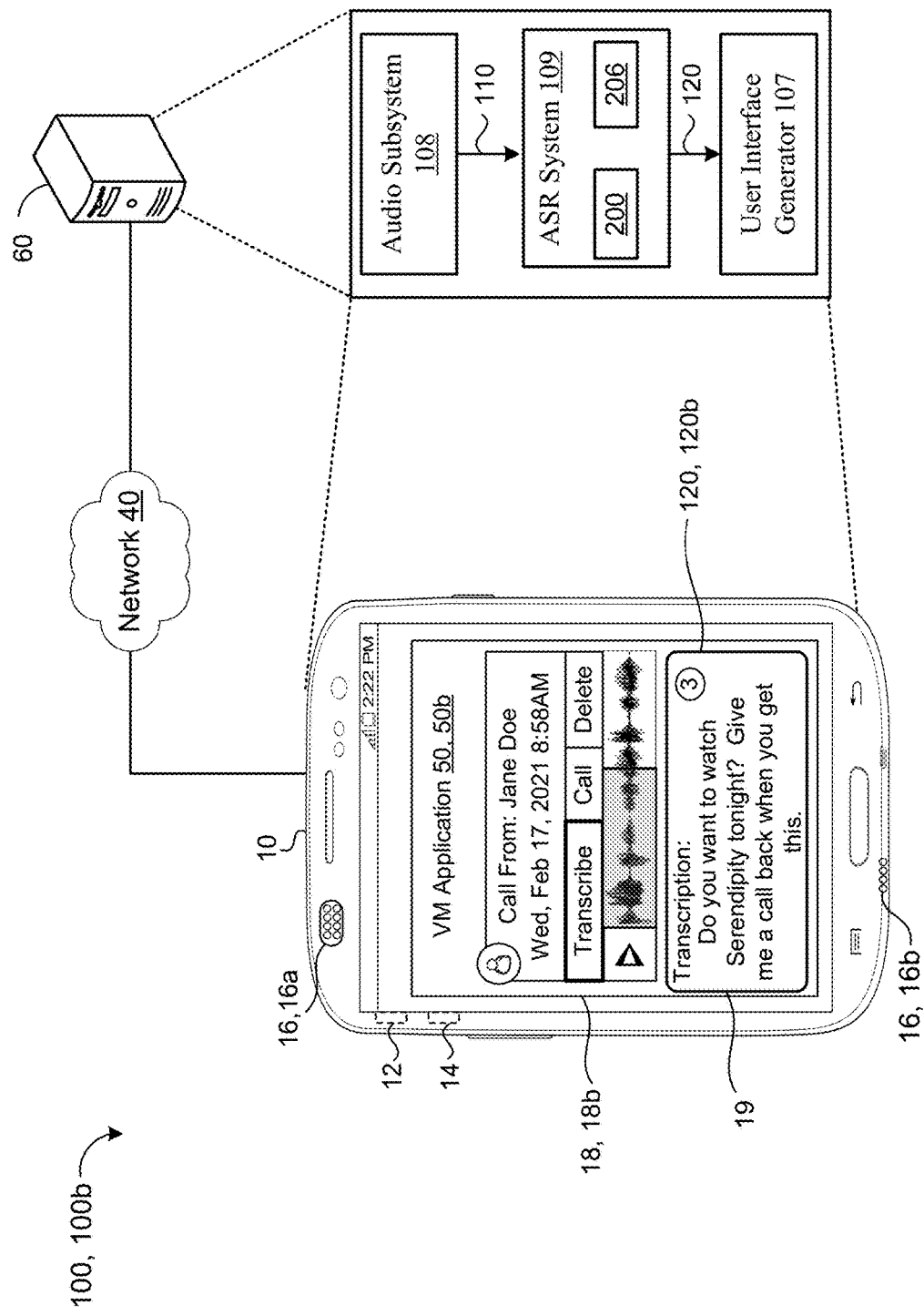

FIGS. 1A and 1B are examples of a speech environment 100, 100a-b. In the speech environment 100, a user's 104 manner of interacting with a computing device, such as a user device 10, may be through voice input. The user device 10 (also referred to generally as device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 109 implementing an ASR model 200 (also referred to as the model 200) integrated with a language model (LM) 206 resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16a, and to convert the utterance 106 into a corresponding digital format associated with input acoustic frames 110 capable of being processed by the ASR system 109. In the example shown in FIG. 1A, the user 104 speaks a respective utterance 106 and the audio subsystem 108 converts the utterance 106 into corresponding audio data (e.g., acoustic frames) 110 for input to the ASR system 109. Thereafter, the model 200 receives, as input, the audio data 110 corresponding to the utterance 106, and generates/predicts, as output, a corresponding transcription 120 (also referred to as a recognition result/hypothesis 120) of the utterance 106. As described in greater detail below (e.g., FIG. 3), the model 200 may be trained in a single training stage to simplify the process of training the model 200 to operate in a streaming and a non-streaming mode. The model 200 also includes a decoder 204 (also referred to as a shared decoder 204) shared between its encoders which enables the model 200 to be a single model that can operate in streaming and non-streaming mode (e.g., in contrast with two separate models where each model is dedicated to either a streaming mode or non-streaming mode). For instance, as shown in FIG. 1A, a digital assistant application 50 executing on the user device 10 may require the speech recognition to be streaming such that words, word pieces, and/or individual characters appear on the screen as soon as they are spoken. Additionally, it is also likely that the user 104 of the user device 10 has a low tolerance for latency when issuing queries for the digital assistant application 50 to perform. In these scenarios where the application demands minimal latency, the model 200 operates in a streaming mode where the model 200 may provide streaming transcription capabilities in real-time as the user 104 is speaking the utterance 106. On the other hand, when the user 104 has a higher tolerance for speech recognition latency and/or the utterance 106 to be recognized is associated with long-form speech (i.e., referring to speech consisting of full paragraphs or multiple sentences), the same model 200 may operate in a non-streaming mode and may leverage a prediction network to provide an accurate transcription 120, but incur increased latency. Additionally, the user 104 requires that the ASR system 109 of the user device 10 is able to accurately identify rare words or long-tail proper nouns which can be achieved through use of the LM 206 with the model 200 to help bias the output of the model 200 when detecting rare words or proper nouns. Accordingly, the ASR system 109 may implement a single ASR model that includes cascaded encoders 210, 220, for a multitude of different speech recognition tasks to provide both streaming and non-streaming transcription capabilities without having to leverage separately trained ASR models on a task-by-task basis while also using the LM 206 to increase the accuracy of the transcription 120 when the utterance 106 includes long-tail proper nouns.

In some implementations, the model 200 performs streaming encoding on the audio data 110 first and then performs non-streaming encoding on the output of the streaming encoder. For instance, in the example shown, the model 200 performs streaming speech recognition on the audio data 110 using a first encoder (i.e., a low latency encoder (FIG. 2B)) to produce partial speech recognition results 120, 120a, and non-streaming speech recognition on the encoded audio data 110 using a second encoder (i.e., a high latency encoder (FIG. 2C)) to produce a final speech recognition result 120, 120b. Notably, the first encoder produces the partial speech recognition results 120a while the second encoder waits for the output of the first encoder to produce the final speech recognition result 120b. Thus, the final speech recognition result 120b for the input utterance 106 may be delayed from the partial speech recognition results 120a for the input utterance by a duration.

The user device 10 and/or the remote computing device 60 also executes a user interface generator 107 configured to present a representation of the transcription 120 of the utterance 106 to the user 104 of the user device 10. As described in greater detail below, the user interface generator 107 may display the partial speech recognition results 120a in a streaming fashion during time 1 and subsequently display the final speech recognition result 120b during time 2. In some configurations, the transcription 120 output from the ASR system 109 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example of FIG. 1A, the user 104 in the speech environment 100a interacts with a program or application 50 (e.g., the digital assistant application 50a) of the user device 10 that uses the ASR system 109. For instance, FIG. 1A depicts the user 104 communicating with the digital assistant application 50a and the digital assistant application 50a displaying a digital assistant interface 18 on a screen of the user device 10 to depict a conversation between the user 10 and a digital assistant of the digital assistant application 50a. In this example, the user 104 asks the digital assistant application 50a, "What year was Serendipity released?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 109.

Continuing with the example, the model 200, while receiving the acoustic frames 110 corresponding to the utterance 106 as the user 104 speaks, encodes the acoustic frames 110 using a first encoder 210 (i.e., FIG. 2A) and then decodes an encoded representation of the acoustic frames 110 using a decoder 204 (FIG. 2A) into the partial speech recognition results 120a. During time 1, the user interface generator 107 presents, via the digital assistant interface 18, a representation of the partial speech recognition results 120a of the utterance 106 to the user 104 of the user device 10 in a streaming fashion such that words, word pieces, and/or individual characters appear on the screen as soon as they are spoken.

After all (or some amount) of the acoustic frames 110 corresponding to the utterance 106 are received, and the first encoder 210 has encoded these acoustic frames 110, the second encoder 220 (i.e., FIG. 2A) encodes the encoding output from the first encoder 210 to generate an encoding for the set of acoustic frames 110 corresponding to the utterance 106 already encoded by the first encoder 210. The decoder 204 then decodes the acoustic frames 110 that have been encoded by the second encoder 220 and processes the decoded acoustic frames 110 using the LM 206 which rescores the decoded acoustic frames and generates a final speech recognition result 120b. For example, when the first encoder 210 encodes all of the acoustic frames 110 corresponding to the utterance 106 (e.g., as the acoustic frames 110 are received), the second encoder 220 encodes all of the acoustic frames 110 that have been encoded by the first encoder 210. In this respect, by encoding over multiple encoded acoustic frames 110, the second encoder 210 is able to provide greater contextual awareness (e.g., by receiving representations of all of the acoustic frames 110 for the utterance 106) in a non-streaming fashion which may potentially reconcile or correct aspect(s) of the utterance 106 missed or misinterpreted by the streaming nature of the first encoder 210. In some examples, an indication, such as an endpoint, that identifies that the user 104 has finished speaking the utterance 106 functions to trigger the second encoder 220 of the model 200 to encode all the acoustic frames 110. In other examples, the second encoder 220 encodes the acoustic frames 110 in parallel with the first encoder 210 and the first encoder 210 identifies the endpoint at the end of the utterance 106, thereby triggering the second encoder 220 to emit the final speech recognition result 120b. The endpoint identified by the first encoder 210 may simultaneously trigger a microphone closing event. During time 2, the user interface generator 107 presents, via the digital assistant interface 18, a representation of the final speech recognition result 120b of the utterance 106 to the user 104 of the user device 10. In some implementations, the user interface generator 107 replaces (or modifies) the representation of the partial speech recognition results 120a with the representation of the final speech recognition result 120b. In this example, the utterance 106 of the user 104 contains a rare word "Serendipity" that the model 200 has not been trained on. Accordingly partial speech recognition results 120a output by the model 200 and displayed on the screen at time 1 incorrectly predicts that the utterance 106 of the user 104 is "What year was serene released?" The final speech recognition result 120b output by the model 200 and displayed on the screen at time 2 at increased latency improves the speech recognition quality in terms of accuracy by identifying that the user 104 said "Serendipity." However, since the user interface generator 107 displays the partial speech recognition results as the user speaks the utterance 106, the higher latency associated with producing, and ultimately displaying the final recognition result 120b is less noticeable to the user 104.

In some implementations, the model 200 utilizes a pre-fetching technique that reduces latency by fetching speech recognition results before the final speech recognition result 120b is available. Here, if the partial speech recognition results 120a match the final speech recognition results, the response fetched for the partial speech recognition results can be emitted instantly to save execution latency that typically occurs after the final speech recognition result is complete.

In the example shown in FIG. 1A, the digital assistant application 50a may respond to the question posed by the user 104 using natural language processing. Natural language processing generally refers to a process of interpreting written language (e.g., the partial speech recognition results 120a and/or the final speech recognition result 120b) and determining whether the written language prompts any action. In this example, the digital assistant application 50a uses natural language processing to recognize that the question from the user 10 regards the user's environment and more particularly a song playing in the user's vicinity. By recognizing these details with natural language processing, the automated assistant returns a response 19 to the user's query where the response 19 states, "Serendipity was released in 2001." In some configurations, natural language processing occurs on the remote computing device 60 in communication with the data processing hardware 12 of the user device 10.

FIG. 1B is another example of speech recognition with the ASR system 109 of the speech environment 100b. As shown in the example, the user 104 interacts with a voicemail application 50, 50b displaying a voicemail application interface 18, 18b on the screen of the user device 10 to transcribe a voicemail that was left for the user 104 by Jane Doe. In this example, latency is not important, however accuracy of the transcription when processing long-tail proper nouns or rare words is important. The model 200 of the ASR system 109 and the LM 206 are able to take advantage of the full context of the audio by waiting until all of the acoustic frames 110 corresponding to the voicemail are generated. This voicemail scenario also illustrates how the model 200 is capable of handling a long-form of speech because a voicemail is often multiple sentences or even several paragraphs. The ability to handle long-form speech is particularly advantageous over other ASR models, such as two-pass models with LAS decoders, because these two pass-models often suffer from long-form issues (e.g., a higher word deletion rate on long-form speech) when applied to long-form conditions. For instance, by using an RNN-T decoder as the decoder 204 in combination with cascading encoders 202 (e.g., the first encoder 210 and the second encoder 220), the model 200 operates for both long-form speech and short-form speech without the long-form setbacks.

With continued reference to FIG. 1B, as discussed with respect to FIG. 1A, the model 200 encodes the acoustic frames 110 using the first encoder 210 while receiving the acoustic frames 110. After the model 200 receives all of the acoustic frames 110 and encodes them with the first encoder 210, the model 200 provides the first encoder output as input to the second encoder 220. The second encoder 220 encodes the first encoder output before the decoder 204 generates an embedding and the LM 206 rescores the decoder 204 output to generate the final speech recognition result 120b. During time 3, the user interface generator 107 presents, via the digital assistant interface 18b, a representation of the final speech recognition result 120b without first displaying the partial speech recognition results 120a. For example, the final speech recognition result 120b is a transcript of the long-form voicemail from Jane Doe that states "Do you want to watch Serendipity tonight? Give me a call back when you get this."

Figure 2A:
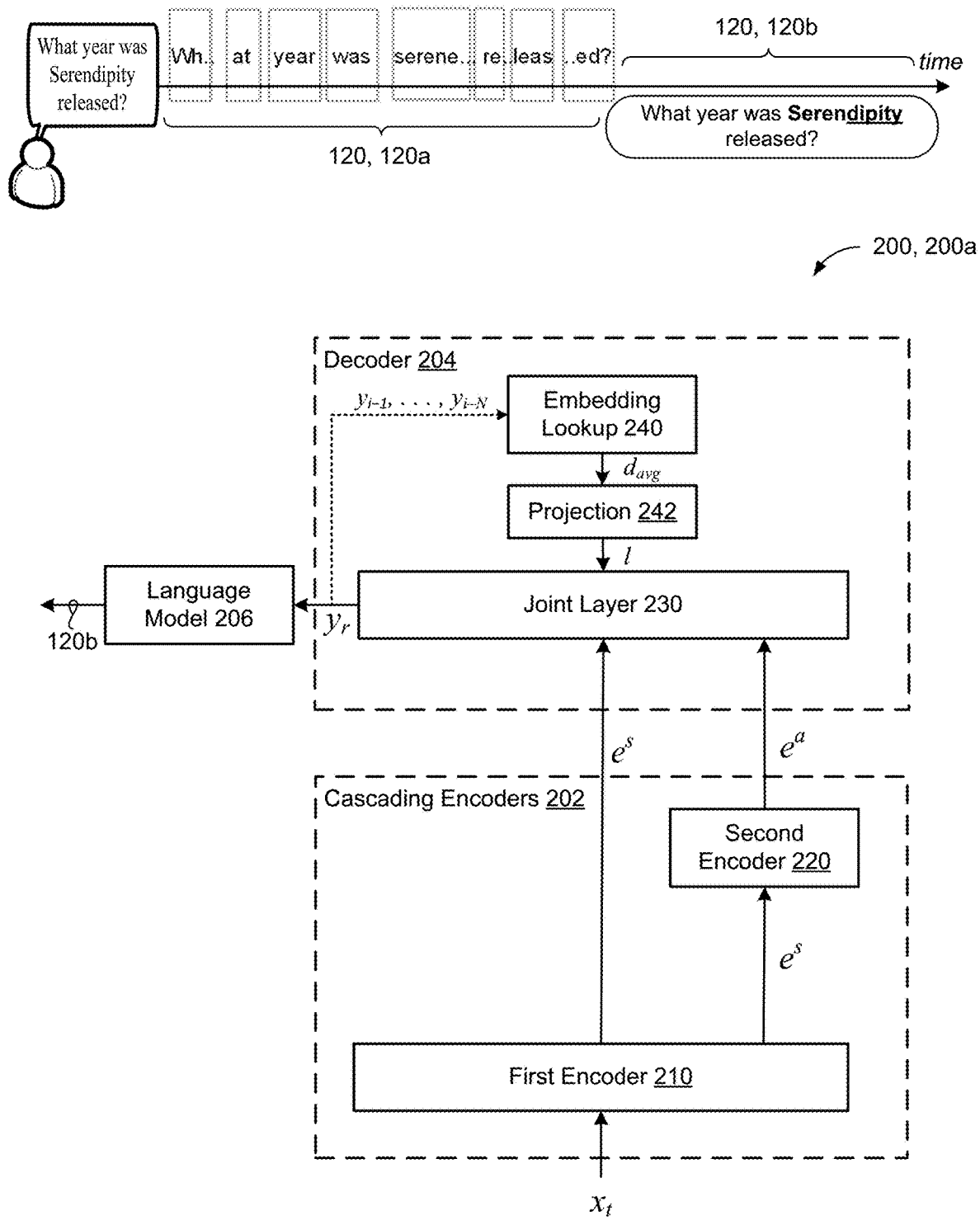
FIGS. 2A-2C are schematic views of the cascaded encoders and language model architecture.
Figure 2B:
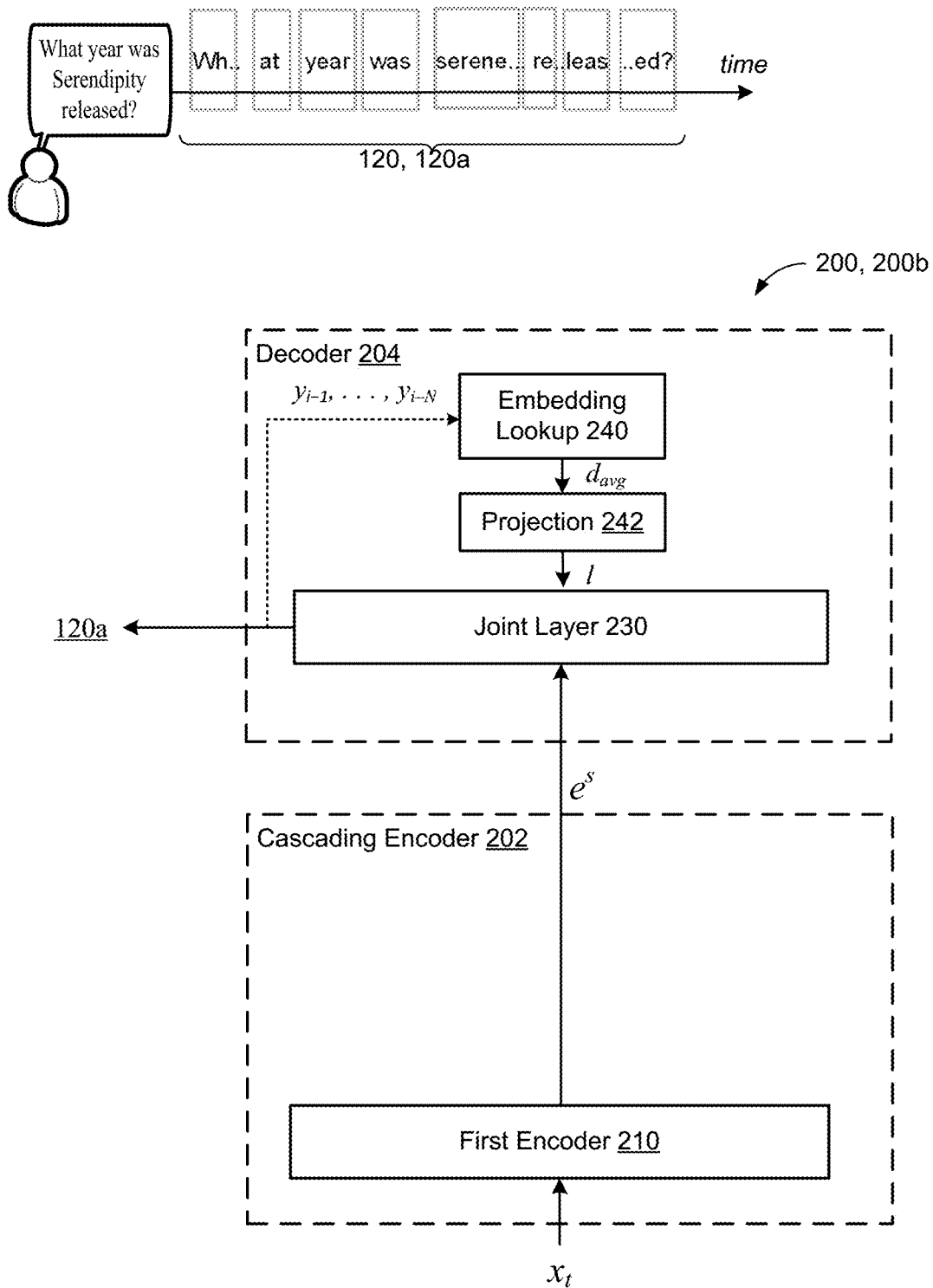
Figure 2C:
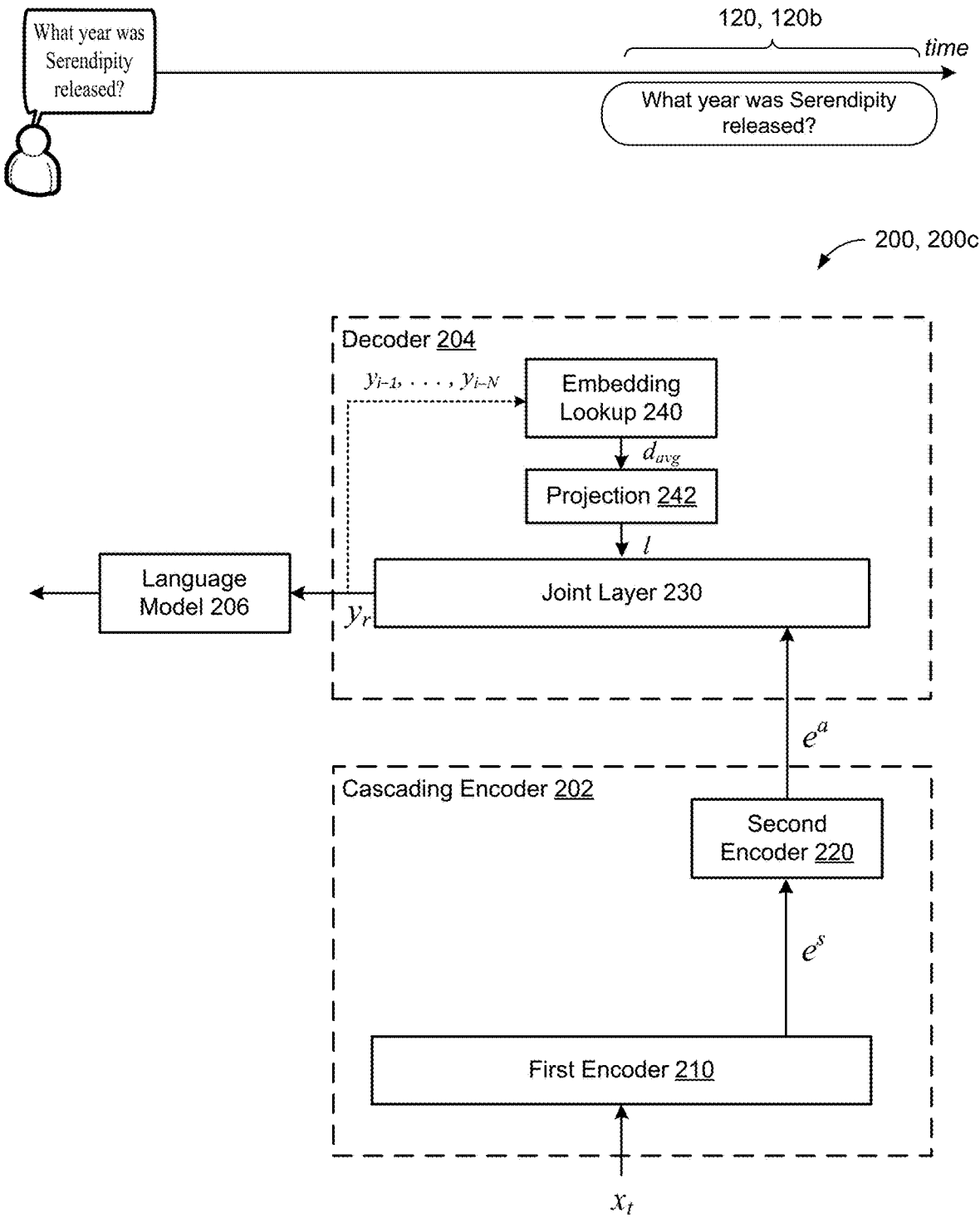

FIGS. 2A-2C include example models 200a-c operating in various combinations of streaming and non-streaming modes. Specifically, each of the models 200a-c include a cascading encoder 202, a decoder 204, and an LM 206. The cascading encoder 202 refers to a model structure where the encoding pathway includes two encoders 210, 220 that cascade such that the output of one encoder 210 feeds the input of the other encoder 220 prior to decoding. Here, the encoders 210, 220 can be cascaded irrespective of the underlying architecture for each encoder. In some examples, the encoders 210, 220 include a stack of 512-dimension conformer layers. Causal convolution and left-context attention layers may be used for each conformer layer to strictly restrict the model use no future inputs. A multi-headed (e.g., 8 heads) attention mechanisms may be used in a self-attention layer. The cascades encoders 210, 220 may include 17 conformer layers. Here, the causal encoder 210 may include 15 conformer layers while the non-causal encoder 210 may include two conformer layers that take in additional right context (e.g., 5.04 seconds). Optionally, transformer layers may be used in lieu of conformer layers.

In other implementations, one encoder is constructed with an LSTM structure while the other encoder is constructed using bi-directional LSTM layers or conformer layers (e.g., a conformer-transducer). In other words, the encoders 210, 220 may have different architectures or similar architectures. For instance, the cascading encoder 202 may be roughly analogous to an acoustic model (AM) in a traditional ASR system, and may include a recurrent network of stacked Long Short-Term Memory (LSTM) layers. Here, the first encoder 210 is a streaming encoder that includes unidirectional Long Short Term Memory (LSTM) layers while the second encoder 220 is a non-streaming encoder that includes bidirectional LSTM layers or conformer layers. In a cascading encoder 202, where both encoders 210, 230 include LSTM layers, the second encoder 220 that receives the output of the first encoder 210 may take advantage of the LSTM layers of the first encoder 210 such that the second encoder 220 includes fewer LSTM layers than the first encoder 210 (and fewer LSTM layers than a fully non-streaming model). By having fewer LSTM layers, the cascading encoder 202 may reduce the number of more computationally expensive bidirectional layers making the model 200 more streamlined than simply combining a traditional streaming model with a traditional non-streaming model.

Referring to FIG. 2A, the first encoder 210 reads a sequence of d-dimensional feature vectors (e.g., acoustic frames 110 shown in FIGS. 1A and 1B) $x=(x_1, x_2, \ldots, x_T)$, where $x_t \in \mathbb{R}^d$, and produces, at each time step, a first higher-order feature representation. This first higher-order feature representation is denoted as $e^s$. Similarly, the second encoder 220 is connected in cascade to the first encoder 210, and is trained to receive the first higher order feature $e^s$ as input, and output a second higher order feature representation. This second higher order feature representation is denoted as $e^a$. Both the first encoder 210 and the second encoder 220 are directly connected to, and shared by, the decoder 204. Accordingly, the decoder 204 receives both the first higher order feature representation $e^s$ and the second higher order feature representation $e^a$ as inputs.

The decoder 204 may include a recurrent neural network-transducer (RNN-T) architecture having a joint layer 230 and a prediction network 240. The prediction network 240 may be a non-recurrent prediction network 240. In some implementations, the prediction network include a V2 embedding lookup table 240. The V2 embedding lookup table 240, given N previous non-blank sub-word unit predictions $y_{i-1}, \ldots, y_{i-N}$, computes the embedding of each of these outputs as $\{d_1, d_2, \ldots d_n\}$. In some examples, the N previous non-blank sub-word unit predictions is equal to the last five non-blank sub-word unit predictions. The V2 embedding lookup table 240 then computes and outputs an average d of the embeddings $\{d_1, d_2, \ldots d_n\}$ to a projection layer 242 with SWISH activation to produce output l provided to the joint layer 230. Notably, the joint layer 230 and the embedding lookup table 240 share the same dimensionality, and therefore, parameters may be shared between the joint layer 230 and the table 240 such that the joint layer 230 is represented as the inverse of the lookup table 240. In the non-streaming mode, the decoder 204 uses the joint layer 230 to combine the first higher order feature representation and second higher order feature representations $e^s$, $e^a$, output by the cascading encoder 202, as well as the average embedding d from the V2 embedding lookup table 240 in order to produce a decoder output. The decoder output can be a probability distribution, $P(y_i|y_{i-1}, \ldots, y_0, x)$, over the current sub-word unit, $y_i$, given the sequence of the N previous non-blank symbols previous units, $\{y_{i-1}, \ldots, y_{i-N}\}$, and input, x. In the non-streaming mode, the decoder output is then passed to the external language model (LM) 206 that rescores/improves the initial outputs from the decoder 204 with techniques such as lattice rescoring or n-best re-ranking. In other words, the decoder 204 produces predictions and the LM 206 finalizes the prediction.

In some implementations, the LM 206 includes a unidirectional conformer that looks back a predetermined number of tokens (e.g., 31 tokens) for each output wordpiece model prediction. The conformer LM 206 may have a stack of layers (e.g., 12 layers) where each layer includes a model dimension of 768, a feedforward layer dimension of 2048, and a six-head attention. In these implementations, the conformer LM 206 is trained to predict 4,096 wordpieces.

Integrating ASR models with external LMs typically requires shallow fusion. However, overconfidence of the cascading encoder 202 and the decoder 204 can make weighting difficult and often lead to high deletions of words. Accordingly, a Hybrid Autoregressive Transducer (HAT) model may be utilized to factor out the internal loss score of the cascading encoder 202 and decoder 204 to facilitate integration with the LM 206.

Although not illustrated, the model 200 may include a Softmax layer that receives output of the decoder 204. In some implementations, the Softmax layer is separate from the decoder 204 and processes the output, $y_r$, from the decoder 204. The output of the Softmax layer is then used in a beam search process to select orthographic elements. In some implementations, the Softmax layer is integrated with the decoder 204, such that the output $y_r$ of the decoder 204 represents the output of the Softmax layer.

The decoder 204 is configured to generate, at each output step, a probability distribution over possible speech recognition hypotheses. Stated differently, the joint layer 230 generates, at each output step (e.g., time step), a probability distribution over possible speech recognition hypotheses. Here, the "possible speech recognition hypotheses" correspond to a set of output labels/symbols (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The output distribution of the joint network 230 can include a posterior probability value for each of the different output labels. Thus, if there are 100 different output labels representing different graphemes or other symbols, the output of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer) for determining the transcription 120.

In some examples, the cascading encoders 202 are composed of a stack of conformer layers. For instance, the first causal encoder 210 may include an initial stack of 15 conformer layers, while the second non-causal encoder 220 may include two additional conformer layers on top of the initial stack of 15 conformer layers. The two non-causal conformer layers make take in an additional predefined duration (e.g., 5.04 seconds) of right context. The conformer layers of the cascading encoders may include 512-dimensional conformer layers and use causal convolution and left-context attention layers to strictly restrict the model to use no future inputs. An 8-head attention may be used in the self-attention layer and the convolution kernel size may be equal to 15.

Figure 3:
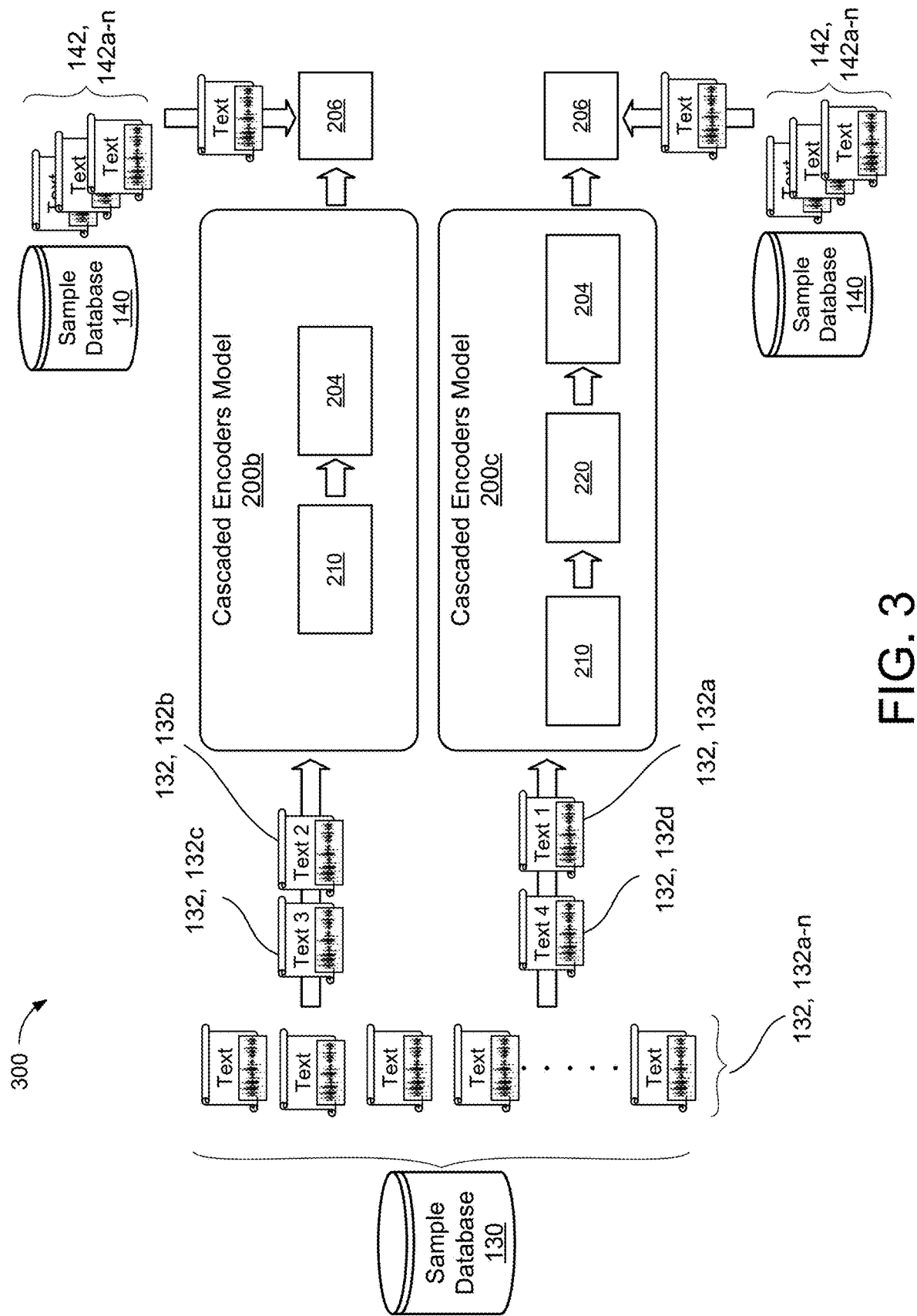
FIG. 3 is a schematic view of an example training process for promoting a cascaded encoders model to learn consistent predictions and promoting a language model to learn consistent rescoring.

Within the decoder 204, the V2 embedding lookup table 240 may be a non-recurrent embedding prediction network having about 2 million parameters. By contrast, an LSTM-based prediction network includes about 23.4 million parameters. In some examples, the prediction network 240 includes the LSTM-based prediction network. Finally, the joint network 230 may include a single feed-forward layer with 640 hidden units. The Softmax layer may be composed of a unified word piece or grapheme set that is generated using all unique word pieces or graphemes in a plurality of training data sets 132, 132a-n (FIG. 3).

The external LM 206 may include a conformer LM using unidirectional, with a look-back attention context of 31 tokens for each output wordpiece model to predict. Here, the LM 20 may include 12 layers, where each layer has a model dimension of 768 and a feedforward layer dimension of 2,048. The number of attention heads may be six (6). The conformer LM 206 may be trained to predict 4,096 wordpieces.

Continuing with the example in FIG. 2A, in some implementations, the model 200a operates in both the streaming and non-streaming modes in parallel. When operating in both streaming and non-streaming mode at the same time, the model 200a first performs streaming speech recognition on the audio data 110 using the first encoder 210 to generate the first higher order representation $e^s$ for both the second encoder 220 and the decoder 204. The decoder 204 then produces the partial speech recognition results 120, 120a. The model 200b also performs non-streaming speech recognition on the encoded audio data 110 where the second encoder 220 uses the first higher order representation $e^s$ received from the first encoder 210 to generate the second higher order representation $e^a$. The decoder 204 then produces a speech recognition result which is then rescored by the LM 206 to produce the final speech recognition result 120, 120b. As noted by the time, the first encoder 210 produces the partial speech recognition results 120a while the second encoder 220 waits for the output of the first encoder 210 to produce the final speech recognition result 120b. Thus, the final speech recognition result 120b for the input utterance 106 may be delayed from the partial speech recognition results 120a for the input utterance. As mentioned previously, the first encoder 210 may identify an endpoint of the utterance 106 that triggers a microphone closing event and triggers the final speech recognition result 120b to be emitted.

Referring to FIG. 2B, in some implementations the model 200b operates only in the streaming mode. This may occur, for instance, when the user 104 is using applications such as voice-search or on-device dictation, which require as little latency as possible. Here, the model 200b performs streaming speech recognition on the audio data 110 using only the first encoder 210 to generate the first higher order representation $e^s$ for the decoder 204. The decoder 204 then produces a speech recognition result which is then rescored by the LM 206 to produce the partial speech recognition results 120, 120a. Because the streaming mode of cascaded encoders model 200b produces the partial speech recognition results 120, 120a quickly, the inaccuracy of the term "playing" is generally acceptable to users 104.

Referring to FIG. 2C, in some implementations the model 200c operates only in the non-streaming mode. The non-streaming mode may occur, for instance, when the user 104 is viewing a transcription of a voicemail left on his/her phone (e.g., FIG. 1). As discussed above, this type of application benefits from using future context to improve performance in exchange for increased processing times. Here, the cascaded encoders model 200c first uses the first encoder 210 to generate the first higher order representation $e^s$ for the second encoder 220, but the decoder 204 does not decode the first higher order representation $e^s$. The cascaded encoders model 200 then performs non-streaming speech recognition on the encoded audio data 110 where the second encoder 220 uses the first higher order representation $e^s$ received from the first encoder 210 to generate the second higher order representation $e^a$. The decoder 204 then produces a speech recognition result which is then rescored by the LM 206 to produce the final speech recognition result 120, 120b. Because the non-streaming mode of the model 200c produces the partial speech recognition results 120, 120b accurately, the delay in time to display the accurate transcription is generally acceptable to users 104.

FIG. 3 shows an example of a training process 300 for training the cascaded encoders and language model 200 to be operable for both streaming and/or non-streaming. In some configurations, the training process 300 executes on the remote computing device 60 of FIGS. 1A and 1B. The training process 300 obtains a plurality of training utterances 132, 132a-n stored in a sample database 130 and trains the model 200 on the training utterances 132. The training process 300 also obtains a plurality of text-only training samples 142, 142a-n stored in a sample database 140 to train the LM 206 of the model 200. The sample databases 130, 140 may reside on the memory hardware of the remote computing device 60. As discussed above with respect to FIG. 2A, the first encoder 210 and the second encoder 220 share the same decoder 204, and can be trained in a single stage, simplifying the training process 300. This means that the non-streaming encoder 220 may be trained directly on the output of the streaming encoder 210 (e.g., the first higher order representation $e^s$) instead of on input acoustic features (e.g., input acoustic frames 110).

As shown in FIG. 3, there are two processing paths for the model 200, one for the streaming mode of the model 200b (shown in FIG. 2B) and one for the non-streaming mode of the model 200c (shown in FIG. 2C). Because there are two input processing paths within training process 300, the cascaded encoders model's loss includes two loss functions. Specifically, the loss for the streaming mode of the model 200b is generally defined as a summation of the negative log probabilities corresponding to the probability distribution over possible speech recognition hypotheses given the input training utterances 132. That is, the cascaded encoders model loss from the first encoder 210 connection to the decoder 204 can be represented as follows.

$$\mathcal{L}_s = -\Sigma_{\{(x \to e^s, y)\}} \log P(y|e^s) \quad (1)$$

The cascaded encoders model loss for the non-streaming mode is also generally defined as a summation of the negative log probabilities corresponding to the probability distribution over possible speech recognition hypotheses given the input training utterances 132. Therefore, the cascaded encoders model loss from the second encoder 220 connection to the decoder 204 can be represented as follows.

$$\mathcal{L}_a = -\Sigma_{\{(x \to e^a, y)\}} \log P(y|e^a) \quad (2)$$

Based on these representations of Equations (1) and (2), the total loss between the two input paths is computed as a weighted sum of each input path loss as follows.

$$\mathcal{L} = \lambda \mathcal{L}_s + (1-\lambda)\mathcal{L}_a \quad (3)$$

where λ is the weighting term. In the training process 300, jointly training the cascaded encoders includes minimizing the weighted sum of the loss between both input processing paths.

At each step-time during training process 300, for each training utterance 132, training can occur in either streaming or non-streaming. In other words, the input processing path is stochastically chosen as either training the cascaded encoders model 200b, or the cascaded encoders model 200c. By sampling the training utterances 132, the training process only needs to calculate the loss once for each training utterance 132 at each training step, which greatly speeds up the training process 300. In some implementations, where a longer training time is tolerated, an alternative training process is employed to train each input processing path with each training utterance and compute both the loss of the cascaded encoders model 200b and the cascaded encoders model 200c for each training utterance 132 at each training step.

In the example shown, training utterances 132b, 132c are chosen to train the first processing path represented by the cascaded encoders model 200b. The cascaded encoders model 200b receives the training utterances 132b, 132c, and the first encoder 210 converts the training utterances 132b, 132c into the first higher order feature representations (e.g., audio embeddings) as output. The decoder 204 then receives the first higher order feature representations of training utterances 132b, 132c as input and generates an output which is tested for its accuracy. Similarly, training utterances 132a, 132d are chosen to train the second processing path represented by the cascaded encoders model 200c. The cascaded encoders model 200c receives the training utterances 132a, 132d, and the first encoder converts the training utterances 132a, 132d into the first higher order feature representations (e.g., audio embeddings) as output. The second encoder 220 receives the first higher order feature representations of training utterances 132a, 132d as input and generates second higher order feature representations of the training utterances 132a, 132d as output. The decoder 204 then receives the second higher order feature representations of training utterances 132a, 132d as input and generates an output which is tested for its accuracy. This ensures that that the model 200 learns to operate in either streaming or non-streaming modes during inference.

As discussed above, integrating training of the cascading encoder 202 and decoder 204 with the LM 206 during training process 300 can lead to high deletions when performing shallow fusion using the following equation.

$$y^* = \arg\max{}_y[\log p(y|x) + \lambda_1 \log plm(y)] \quad (4)$$

where $\lambda_1$ includes a weight assigned to the LM 206 and plm(y) denotes the external LM 206. In order to avoid the high deletions caused by shallow fusion, techniques such as coverage penalty and blank scaling are used. Moreover, HAT factorization proposes a way to factor out an internal language model score $P_{ILM}(y)$ of the model 200 so that the effective score of the model 200 can be represented as follows.

$$\log p(x|y) \approx \log p(y|x) - \log plm(y) \quad (5)$$

Accordingly, HAT factorization allows the integration of the model 200 with the external LM 206 without requiring coverage penalties as follows.

$$y^* = \arg\max{}_y[\lambda_1 \log p(y|x) - \lambda_2 \log pilm(y) + \log plm(y)] \quad (6)$$

where $\lambda_1$ and $\lambda_2$ denote weights assigned to the external LM 206 and the internal language model, respectively. By using HAT factorization during the training process 300, the LM 206 is better integrated with the cascading encoder 202 and decoder 204.

The LM 206 may be trained on text-only data including more than 100 billion utterances across multiple domains. Rare words in the text-only data may be identified. For instance, words that occur five times or less may be identified as rare words. Additionally, words having surprising pronunciations given their spellings may be identified. These rare words and surprising pronunciation words may be synthesized to form audio-text pairs of a long-tail set for training the ASR model 200.

Figure 4:
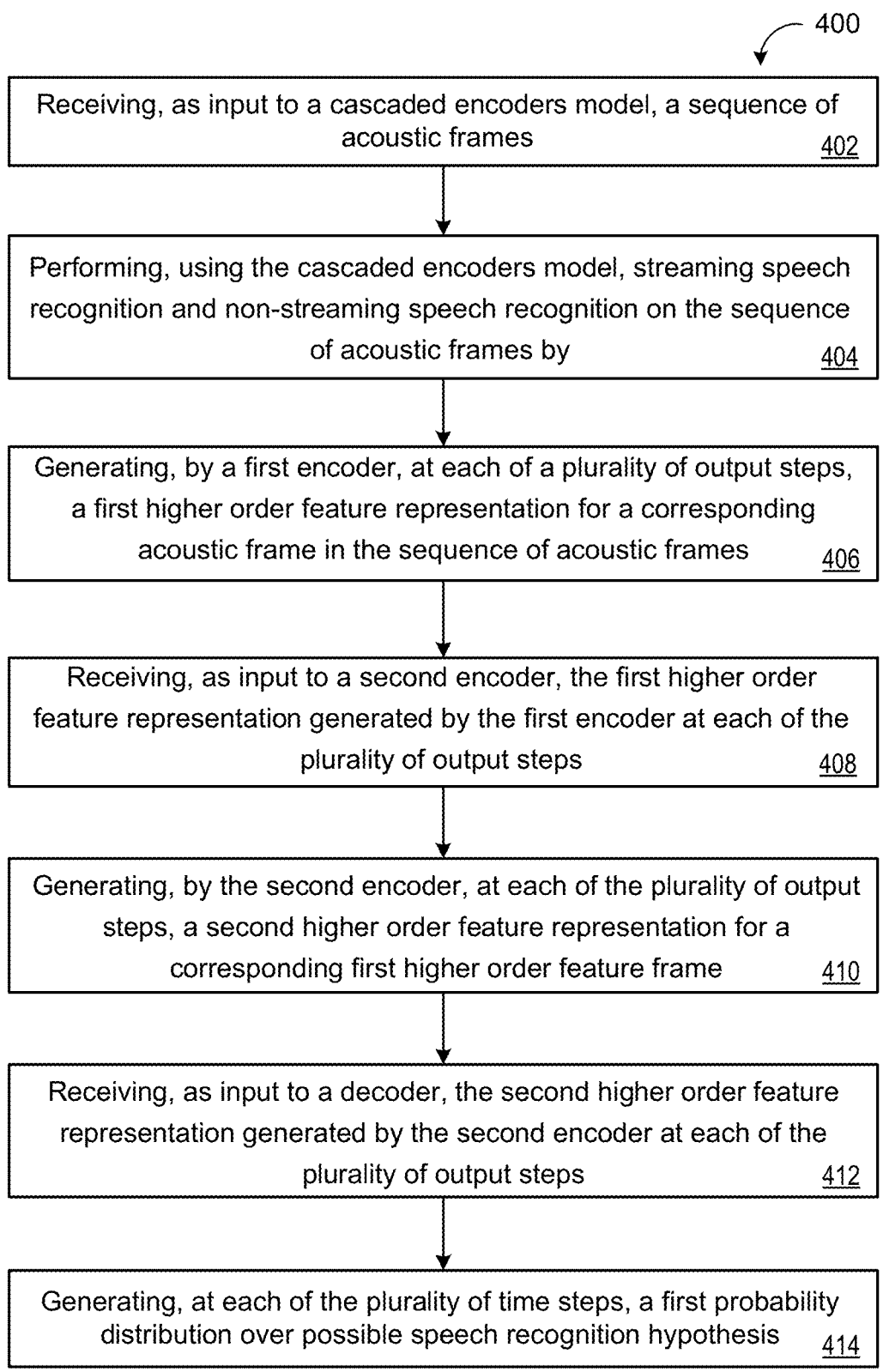
FIG. 4 is a flowchart of an example arrangement of operations for a method of implementing the cascaded encoders and language model for streaming and non-streaming automatic speech recognition.

FIG. 4 includes a flowchart of an example arrangement of operations for a method 400 of performing streaming and non-streaming speech recognition using a cascaded encoders model 200. At operation 402, the method 400 includes receiving, as input to a cascaded encoders model 200, a sequence of acoustic frames 110. At operation 404, the method 400 further includes performing, using the cascaded encoders model, streaming speech recognition and non-streaming speech recognition on the sequence of acoustic frames 110.

At operation 406, the method 400 includes generating, by a first encoder 210, at each of a plurality of output steps, a first higher order feature representation for a corresponding acoustic frame 110 in the sequence of acoustic frames 110. The method 400 further includes, at operation 408, receiving, as input to a second encoder 220, the first higher order feature representation generated by the first encoder 210 at each of the plurality of output steps. At operation 410, the method 400 also includes generating, by the second encoder 220, at each of the plurality of output steps, a second higher order feature representation for a corresponding first higher order feature frame. The method 400 also includes, at operation 412, receiving, as input to a decoder 204, the second higher order feature representation generated by the second encoder 220 at each of the plurality of output steps. At operation 414, the method 400 further includes generating, at each of the plurality of time steps, a first probability distribution over possible speech recognition hypothesis.

Figure 5:
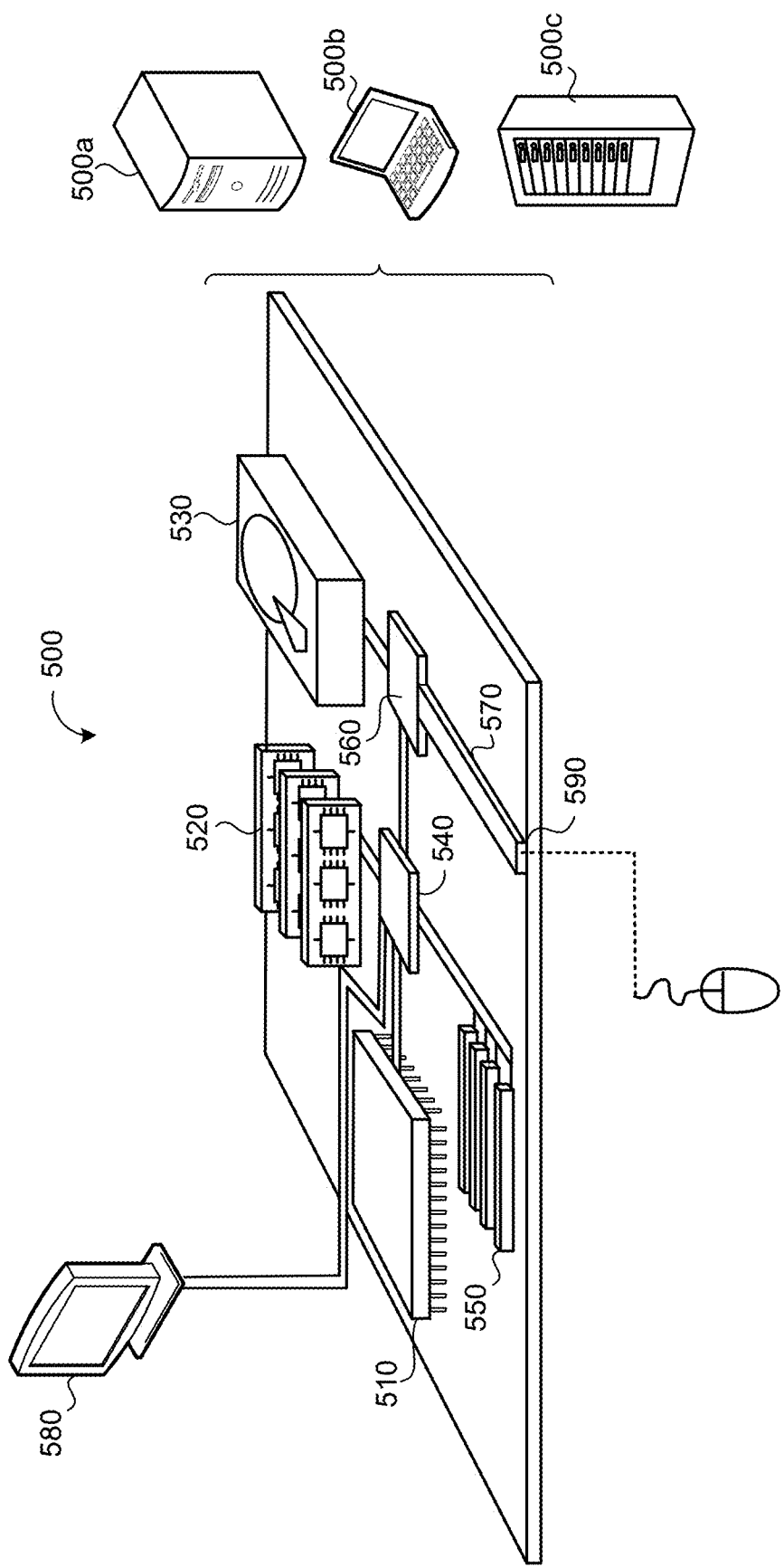
FIG. 5 is a schematic view of an example computing device that may be used to implement the systems and methods described herein.

FIG. 5 is schematic view of an example computing device 500 that may be used to implement the systems (e.g., the audio subsystem 108, the ASR system 109, the user interface generator 107, and/or the model 200) and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   receiving, as input to a cascaded encoder, a sequence of acoustic frames corresponding to an utterance as a user speaks the utterance;
   at each corresponding output step of a plurality of output steps commencing a predefined duration after an initial acoustic frame in the sequence of acoustic frames is received:
      generating, by the cascaded encoder, a corresponding higher order feature representation for a corresponding acoustic frame; and
      generating, by a decoder configured to receive the corresponding higher order feature representation generated by the cascaded encoder at the corresponding output step, a probability distribution over possible output labels; and
   rescoring, by an external language model, the probability distribution over possible output labels generated by the decoder at each of the plurality of output steps to generate a transcription of the utterance.

2. The computer-implemented method of claim 1, wherein the cascaded encoder comprises a causal encoder and a non-causal encoder overlain on the causal encoder.

3. The computer-implemented method of claim 2, wherein:
   the causal encoder comprises an initial stack of multi-headed attention layers; and
   the non-causal encoder comprises a final stack of multi-headed attention layers overlain on the initial stack of multi-headed attention layers.

4. The computer-implemented method of claim 3, wherein the initial stack of multi-headed attention layers comprises a greater number of multi-headed attention layers than the final stack of multi-headed attention layers.

5. The computer-implemented method of claim 3, wherein the multi-headed attention layers comprise Conformer layers.

6. The computer-implemented method of claim 3, wherein the multi-headed attention layers comprise Transformer layers.

7. The computer-implemented method of claim 1, wherein the possible output labels comprise wordpieces.

8. The computer-implemented method of claim 1, wherein the external language model comprises a neural language model.

9. The computer-implemented method of claim 8, wherein the neural language model comprises a stack of Conformer layers or Transformer layers.

10. The computer-implemented method of claim 1, wherein:
    the language model is trained on text-only data; and
    the first encoder and the second encoder are trained using Hybrid Autoregressive Transducer Factorization to facilitate integration of the external language model trained on text-only data.

11. A system comprising:
    data processing hardware; and
    memory hardware in communication with the data processing hardware and storing instructions that when executed on the data processing hardware causes the data processing hardware to perform operations comprising:

receiving, as input to a cascaded encoder, a sequence of acoustic frames corresponding to an utterance as a user speaks the utterance;

at each corresponding output step of a plurality of output steps commencing a predefined duration after an initial acoustic frame in the sequence of acoustic frames is received:

generating, by the cascaded encoder, a corresponding higher order feature representation for a corresponding acoustic frame; and generating, by a decoder configured to receive the corresponding higher order feature representation generated by the cascaded encoder at the corresponding output step, a probability distribution over possible output labels; and rescoring, by an external language model, the probability distribution over possible output labels generated by the decoder at each of the plurality of output steps to generate a transcription of the utterance.

12. The system of claim 11, wherein the cascaded encoder comprises a causal encoder and a non-causal encoder overlain on the causal encoder.

13. The system of claim 12, wherein:
the causal encoder comprises an initial stack of multi-headed attention layers; and
the non-causal encoder comprises a final stack of multi-headed attention layers overlain on the initial stack of multi-headed attention layers.

14. The system of claim 13, wherein the initial stack of multi-headed attention layers comprises a greater number of multi-headed attention layers than the final stack of multi-headed attention layers.

15. The system of claim 13, wherein the multi-headed attention layers comprise Conformer layers.

16. The system of claim 13, wherein the multi-headed attention layers comprise Transformer layers.

17. The system of claim 11, wherein the possible output labels comprise wordpieces.

18. The system of claim 11, wherein the external language model comprises a neural language model.

19. The system of claim 18, wherein the neural language model comprises a stack of Conformer layers or Transformer layers.

20. The system of claim 11, wherein:
the language model is trained on text-only data; and
the first encoder and the second encoder are trained using Hybrid Autoregressive Transducer Factorization to facilitate integration of the external language model trained on text-only data.

* * * * *